United States Patent
Tatsutomi

[15] 3,704,591
[45] Dec. 5, 1972

[54] SYSTEM FOR PURIFYING EXHAUST GAS OF AN INTERNAL COMBUSTION

[72] Inventor: Yasuo Tatsutomi, Hiroshima, Japan
[73] Assignee: Toyo Kogyo Co., Ltd., Hiroshima-ken, Japan
[22] Filed: Jan. 14, 1971
[21] Appl. No.: 106,423

[30] Foreign Application Priority Data

Jan. 14, 1970 Japan .................................. 45/4015
April 25, 1970 Japan ............................. 45/35553

[52] U.S. Cl. ........................ 60/290, 60/285, 60/289, 123/8.05, 123/148 DS
[51] Int. Cl. ............................................ F02b 75/10
[58] Field of Search .............. 60/30 R, 290, 289, 285; 123/148 DS, 8.05, 8.09

[56] References Cited
UNITED STATES PATENTS

| | | |
|---|---|---|
| 3,481,144 | 12/1969 | Morrell ................................ 60/30 R |
| 3,486,326 | 12/1969 | Hermes ............................... 60/30 R |
| 3,534,717 | 10/1970 | Froede .............................. 123/8.05 |
| 3,561,410 | 2/1971 | Soeters ............................. 123/117 A |
| 3,584,608 | 6/1971 | Shibagaki ....................... 123/148 DS |

*Primary Examiner*—Douglas Hart
*Attorney*—Sughrue, Rothwell, Mion, Zinn & Macpeak

[57] ABSTRACT

A system for purifying an exhaust gas of an internal combustion engine where secondary air is supplied to the exhaust gas system for reburning the exhaust gas includes a first switch switching at a predetermined engine temperature, a second switch switching upon detecting engine speed, for switching ON and OFF, the operation of said secondary air supplying means at both high and low speed set values in response to the switching of said first switch.

14 Claims, 3 Drawing Figures

INVENTOR
YASUO TATSUTOMI

SYSTEM FOR PURIFYING EXHAUST GAS OF AN INTERNAL COMBUSTION

BACKGROUND OF THE INVENTION

1. Field of the Invention

This invention relates to improvements in a system for purifying the exhaust gas containing unburned detrimental components of an internal combustion engine, and more particularly to a system for purifying the exhaust gas which has secondary air supplying means for supplying the secondary air to the exhaust gas system in response to the operating conditions such as engine temperature, and speed, and further to a system for purifying the exhaust gas to control so as to stop or only delay igniting of any one plug of two plugs provided in the same combustion chamber in an internal combustion engine in response to the aforesaid operating conditions.

2. Description of the Prior Art

In general, the quantity and sensity of unburned detrimental components such as carbon monoxide or hydrocarbon, etc., contained in the exhaust gas of an internal combustion engine may vary depending upon the engine operating conditions such as engine temperature and engine speed. It follows that when the cooling water, cooling oil or exhaust gas of the engine does not yet reach a required high temperature, during the so-called warming operating of the engine, combustion efficiency is poor and a great deal of unburned detrimental components such as carbon monoxide and hydrocarbon exist in the exhaust gas, because the engine temperature is low. In order to remove these detrimental components so as to prevent pollution, it is necessary to supply secondary air into the exhaust gas so that they are reburned within a reactor provided in the exhaust gas system. But, since the reactor temperature does not reach a predetermined high temperature upon warming operation of the engine, the combustion efficiency of the reactor is also poor, with the result that a great deal of detrimental components exist broadly up and to the engine high speed region. Further, in an engine which has two plugs in one combustion chamber such as, for example, in a rotary piston internal combustion engine, it is worse in terms of removing the unburned detrimental components of the exhaust gas in the low speed region of the engine to ignite two spark plugs at normal timing which is otherwise suitable for power output performance. If one of the two spark plugs is retarded in ignition, though the power output of the engine somewhat deteriorates, there is a slight improvement in terms of removing the unburned detrimental components of the exhaust gas. Furthermore, if one of the spark plugs is cut out, though the power output of the engine is further deteriorated, engine operation is further improved in terms of removing the unburned detrimental components of the exhaust gas.

After the warming operation of the engine where the engine cooling water and cooling oil reach a predetermined high temperature, the engine and reactor are heated to a high temperature, with the result that the combustion efficiency of the engine and reactor is improved so that the detrimental components contained in the exhaust gas is decreased. But, relatively large detrimental components are still contained in the exhaust gas particularly in low engine speed region.

SUMMARY OF THE INVENTION

The present invention provides a system for purifying exhaust gas which comprises secondary air supplying means for supplying secondary air to the exhaust gas system of an internal combustion engine in response to operating conditions such as engine temperature and speed of the internal combustion engine.

It is another object of the present invention to provide such a system which supplies secondary air to the exhaust gas system at low to high engine speeds during the warming operation of an internal combustion engine and during low engine speeds after its warming operation. It is a further object of the present invention to provide a system for purifying exhaust gas of an internal combustion engine employing two spark plugs in one cylinder which stops or delays the igniting of only one of two spark plugs in response to the operating conditions of the engine.

The present invention will become apparent from the following description taken in conjunction with the accompanying drawings.

DESCRIPTION OF THE PREFERRED EMBODIMENTS

Figure 1:
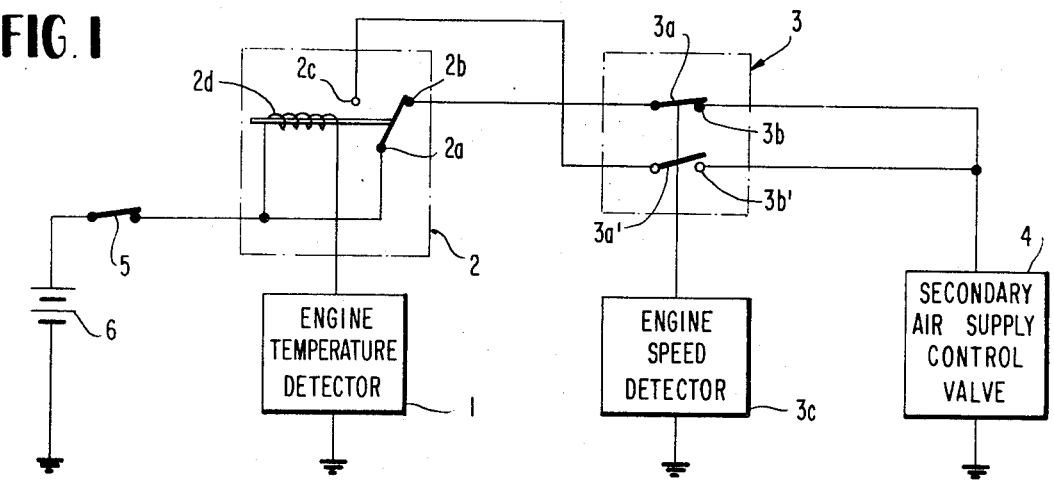
FIG. 1 is a schematic view of a system for purifying exhaust gas according to this invention which controls the supply of secondary air to the exhaust system of an internal combustion engine.

Reference is now made to FIG. 1, which shows schematic wiring diagram of a system for purifying the exhaust gas of an internal combustion engine.

Reference numeral 1 illustrates a temperature detector for detecting the temperature of cooling water, oil or exhaust gas of an internal combustion engine (not shown). A relay 2 or switching circuit is operated by the temperature detector 1. Switching means 3 opens or closes its contacts upon detection of high or low engine speed. Secondary air supply means 4 includes control means such as an electromagnetic clutch of an air pump or solenoid valve for the secondary air supply which supplies secondary air to the exhaust gas upon energization of the switching means 3.

The temperature detector 1 is connected to a relay coil 2d for switching movable contact 2a of the relay 2 from contact with a normally closed fixed contact 2b to a normally open fixed contact 2c. The movable contact 2a of the relay 2 is normally closed upon normally closed contact 2b as shown in the drawing when the engine cooling water is at low temperature.

Switching means 3 is responsive to speed detector 3c for detecting the engine speed; contacts 3a and 3b being closed from zero r.p.m. to a high speed such as 4,000 r.p.m. Contacts 3a' and 3b' are closed in a low engine speed region such as, for example, below 2,000 r.p.m. The movable contact 3a for high speed is electrically connected to fixed contact 2b for low temperature, and the movable contact 3a' for low speed is connected to fixed contacts 2c for high temperature. The high and low speed fixed contacts 3b and 3b' are connected to the secondary air supplying means 4. The relay coil 2d and movable contact 2a are connected through a main switch 5 to a source of power 6 so as to energize the secondary air supplying means by the operation of the relay 2, and the switching means 3.

In operation of the thus constructed system of this invention, when the main switch 5 is closed to start the internal combustion engine, the combustion efficiency of fuel within the combustion chamber of the engine and the combustion efficiency of the reactor are worse when the engine and reactor are cold and a great deal of unburned components such as detrimental hydrocarbon and carbon monoxide are exhausted. Thus, since the temperature of cooling water is low while the engine is warming up, the temperature detector 1 is not operating to close the circuit with the result that the relay coil 2d is de-energized so that the movable contact 2a of the relay 2 contacts the low temperature contact 2b and the movable contact 3a for high speed of the switching means 3 is energized.

On the other hand, if the engine rotates at a speed below the predetermined high value, for example, 4,000 r.p.m., within which the high speed movable contacts 3a and 3b of the speed detector 3 are closed, the high speed movable contact 3a is held in contact with the contact 3b, and accordingly the secondary air supplying means 4 is energized through the main switch 5, relay contacts 2a and 2b and high speed contacts 3a and 3b by the source of power 6, so that the secondary air supplying means 4 feeds secondary air into exhaust gas before passing the reactor (not shown) with the result that the unburned components contained within the exhaust gas are reburned to reduce or eliminate pollution.

Then, if the engine reaches above a high predetermined speed such as, for example, 4,000 r.p.m., even if the engine is warming up, the combustion efficiency becomes good so that the generation of unburned detrimental gas is decreased to an allowable range with the result that the high speed contact 3a is opened to shut off the supply of secondary air.

After warming up time and when the cooling water temperature has increased accordingly, the temperature detector 1 operates by temperature increase, the movable contact 2a switches from the low temperature contact 2b to the high temperature contact 2c because of the energization of relay coil 2d. In such a state, if the engine is rotating below a low predetermined speed such as, for example, 2,000 r.p.m., the low speed movable contact 3a' is closed with the contact 3b', with the result that the secondary air supplying means 4 is energized to feed secondary air into the exhaust gas before passing the reactor (not shown) so that a great deal of unburned detrimental gases generated upon low speed of the engine is reburned to reduce or eliminate pollution.

Then, if the engine speed increases to above the low predetermined speed such as, for example, 2,000 r.p.m., the low speed contact 3a' is opened to shut off secondary air.

Accordingly, according to the present invention, since the time of supplying secondary air into exhaust gas is predetermined from the relation of the temperature and speed of the engine in order to reduce the unburned detrimental components contained within the exhaust gas, it is very useful in practice in comparison with conventional arrangements.

Thus, it should be understood from the foregoing description that the present invention provides a system for purifying exhaust gas which comprises a switching circuit switching at low and high temperature by the operation of a temperature detector for detecting the temperature of the engine cooling water, oil or exhaust gas, switching means detecting high or low engine speed, and a secondary air supplying means for operating, by the detecting action of both switching means. Thereby, the secondary air supply means is controlled to supply the secondary air into exhaust gas by the high speed circuit of the switching means upon warming of the engine and by the low speed circuit of the switching means after warming of the engine.

Thus, the system of this invention eliminates the exhaust of a great deal of unburned components contained within the exhaust gas of the engine into an atmosphere without lowering the power of the engine to greatly effect the removal of public pollution.

Other embodiments of the present invention will now be described with reference to FIGS. 2 and 3, particularly to FIG. 2, which shows a system for purifying exhaust gas of an internal combustion engine having two spark plugs in the same combustion chamber, wherein the like parts and components thereof are designated by the same numerals as those in FIG. 1.

Switching means 3 includes a high speed detector 3e for detecting a high engine speed region, such as, for example, 4,000 r.p.m., and switching movable contact 3d at a high predetermined value when temperature detector 1 is not operated, and a low speed detector 3f for detecting a low engine speed region such as, for example, 2,000 r.p.m., and switching the movable contact 3d at a low predetermined value when the temperature detector 1 is operating. It follows that the high speed detector 3e is connected to low temperature contact 2b of a switching circuit 2 and the contact 3d so that when movable contact 2a is closed on the low temperature contact 2b, if the engine speed is below a high predetermined value such as, for example, 4,000 r.p.m., the movable contact 3d is closed on contact 3g which is connected to a secondary air supplying means 4 and operate the means 4 to supply secondary air. If engine speed reaches a high predetermined value, contact 3d closes on contact 3h connected to the high temperature contact 2c of switching circuit 2 so as to close off the operation of the secondary air supplying means 4. The low speed circuit 3f is connected to the low temperature contact 2b and high temperature contact 2c of switching circuit 2 and the movable contact 3d, so that when the movable contact 2a contacts the high temperature contact 2c, if the engine speed is below a low predetermined value such as, for example, 2,000 r.p.m., the contact 3d closes upon contact 3g so as to operate the secondary air supplying means 4 to supply secondary air and if the engine speed moves above a low predetermined value, the contact 3d closes on contact 3h to stop the operation of the secondary air supplying means 4. The low speed detector 3f is connected to the low temperature contact 2b, this is to prevent operation by the low speed detector 3f when the temperature detector 1 is not operated.

Reference numeral 7a illustrates a first spark plug connected to the high temperature contact 2c of the switching circuit 2 through first ignition coil 8a. 7b is a second spark plug connected to a source of power 6 through a second ignition coil 8b and main switch 5, and 9a and 9b interrupters connected to the ignition coils 8a and 8b, respectively.

10 is a vacuum switch disposed between the first ignition coil 8a and the main switch 5 for closing a movable contact 10a upon fixed contact 10b when the engine is idling, is decelerating or is operated in full load. It follows that the vacuum switch 10 is provided to ignite both spark plugs in such engine operation when the temperature detector 1 is not operated, i.e., when the engine is warming up to prevent the engine from decreasing the power or from operating unsmoothly. It is not necessary to provide the vacuum switch 10. If the vacuum switch 10 is not provided, only one of both spark plugs is ignited when the engine is warming up and at the same time engine speed is below the high predetermined speed, such as 4,000 r.p.m., after warm up.

In operation of thus constructed device of this embodiment, since the engine is in warming up operation if the main switch 5 is closed to start the engine after a long stoppage of the engine, the temperature detector 1 is not operates so that the movable contact 2a of the switching circuit 2 is closed upon the low temperature contact 2b. In such state, the engine speed is detected by the high speed circuit 3e, wherein if the engine speed is below a high predetermined value such as, for example, 4,000 r.p.m., the contact 3d is closed with contact 3g with the result that secondary air is supplied into the exhaust gas by the operation of the secondary air supplying means 4. In such state, when the vacuum switch is not closed, the first ignition coil 8a is not energized with the result that the first spark plug 7a is not ignited and accordingly only the second spark plug 7b is ignited. When the vacuum switch 10 is closed, both spark plugs 7a, 7b are ignited. Then, if the engine speed reaches above a high predetermined value, the movable contact 3d moves to contact 3h by the high speed detector 3e to shut off the energization of the secondary air supplying means 4 and accordingly it shuts off the supply of secondary air to the exhaust gas and at the same time ignites the first spark plug 7a regardless of the operation of the vacuum switch 10.

Further, after the engine is warmed up the temperature detector 1 is operated by the engine temperature to energize the coil 2d of the switching circuit 2 and to open contact 2a from the low temperature contact 2b and close it upon the high temperature contact 2b. In such state, the engine speed is detected by the low speed detector 3f, wherein if the engine speed is below a low predetermined value such as for example, 2,000 r.p.m., switch 3d is closed upon contact 3g to supply secondary air into exhaust gas by the operation of the secondary air supplying means 4. Then, if the engine speed increases above a low predetermined value, contact 3d shuts off energization of the secondary air supplying means 4, so as to shut off the supply of the secondary air into the exhaust gas. Whereupon, though the contact 3d is closed with the contact 3h, the movable contact 2a is already closed with the high temperature contact 2c with the result that the first spark plug 7a is ignited regardless of the engine speed and operation of the vacuum switch 10.

Accordingly, since the system of this invention stops ignition of the first spark plug and at the same time supplies secondary air into the exhaust gas during and up to value the engine high speed value when the engine is warming up in operation existing a great deal of detrimental components within the exhaust gas, the combustion gas within the engine is at high temperature when introduced into the reactor, the detrimental components are reburned to be removed within the reactor up and to the high engine speed valve with the result that the exhaust gas discharged into the atmosphere has very little detrimental components, and further the reactor is warmed up earlier so that optimum performance of the reactor is achieved in short time. If the engine speed reaches above a predetermined value upon warming up the engine, the first spark plug is ignited so that it prevents the engine power from decreasing.

Even if the temperatures of the engine and reactor reach a predetermined high temperature at the end of the warming up operation, secondary air is supplied into the exhaust gas in the low speed region of the engine having relatively large detrimental components and the detrimental components are reburned to be removed within the reactor, with the result that purified exhaust gas is discharged into the atmosphere.

It is understood that the present invention removes the detrimental components in the exhaust gas without lowering the engine power by the relationship between the engine temperature, speed and ignition timing to prevent public pollution.

Though in the embodiment of the present invention the switching circuit 2 is shown as a contact relay and the switching means 3 are contact switches, these may readily be no-contact switching circuits using transistors, and this invention is not restricted to the embodiments described as above.

Figure 3:
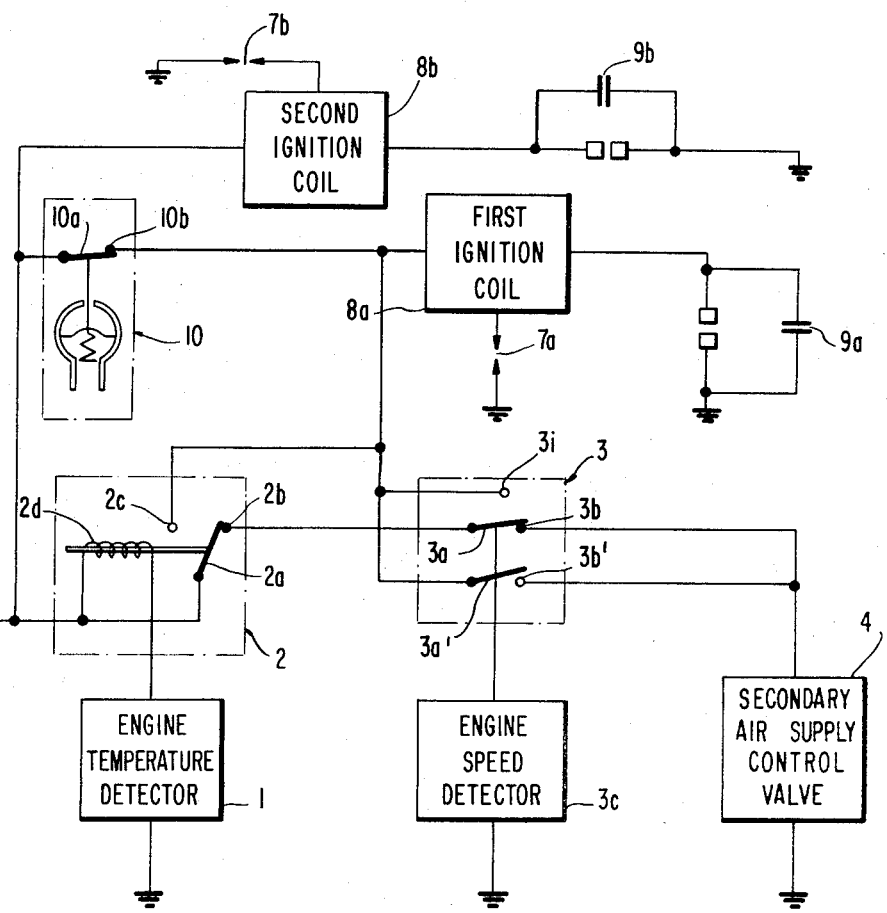
FIGS. 2 and 3 are schematic views of modified embodiments of systems for purifying exhaust gas according to this invention which control the supply of the secondary air and ignition of spark plug.
Figure 2:
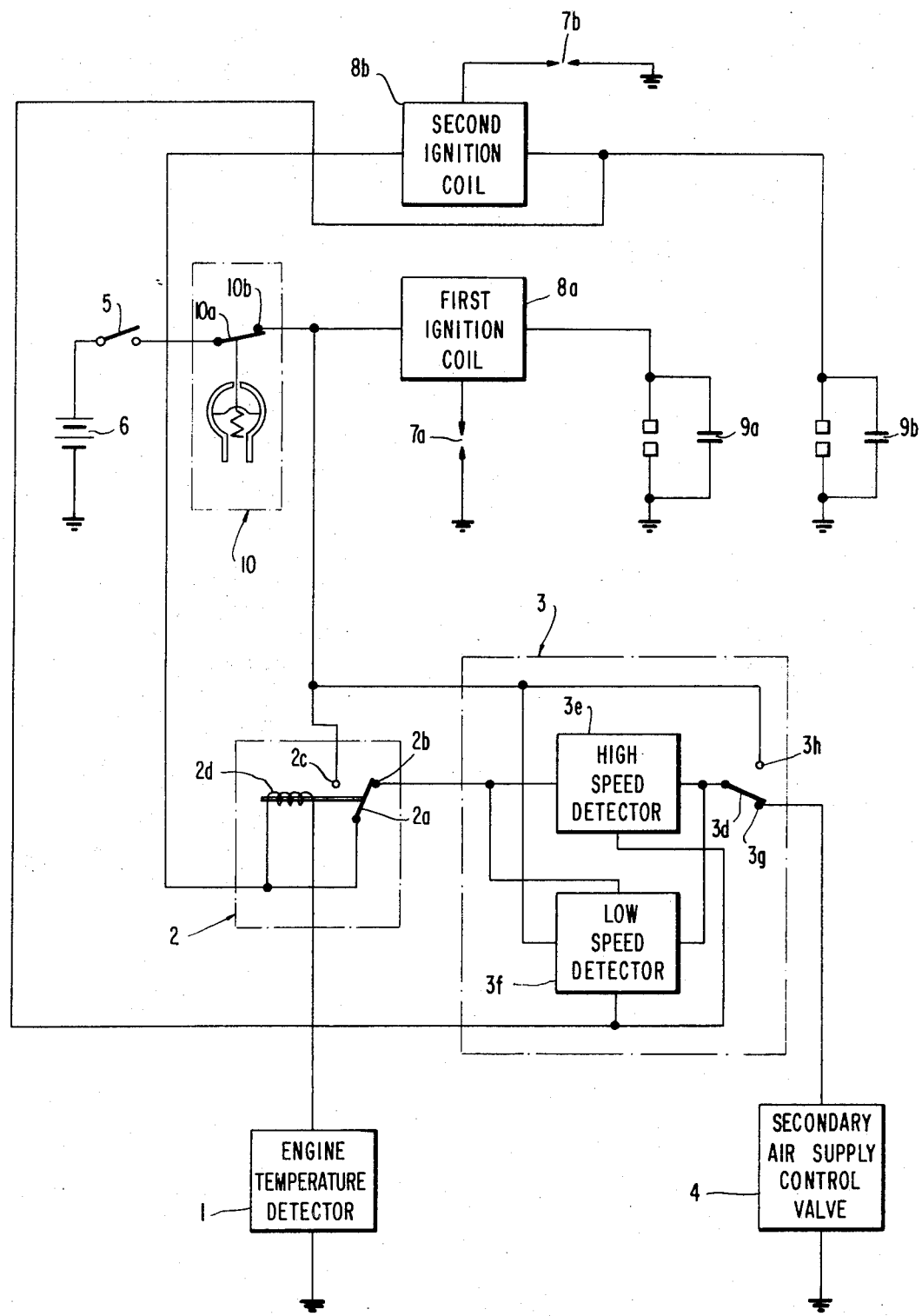

Reference is made to FIG. 3, which shows a system for purifying exhaust gas used in an internal combustion engine similar to that shown in FIG. 2, wherein the difference is the switching circuit 3.

This embodiment is a system for purifying exhaust gas which adds an ignition control device to the embodiment shown in FIG. 1, wherein a fixed contact 3i is provided with respect to movable contact 3a and is connected to the fixed contact 2c.

The movable contact 3a is closed upon contact 3b until the engine speed reaches a predetermined high speed region such as, for example, 4,000 r.p.m., upon warming up of the engine to operate the secondary air supplying means, and if the engine speed reaches above a predetermined high speed, the movable contact 3a is disconnected from contact 3b, and closes upon the contact 3i to ignite the first spark plug 7a. Accordingly, it may operate similar to that shown in FIG. 2 to provide substantially the same effect.

What is claimed is:

1. A system for purifying an exhaust gas of an internal combustion engine comprising:
   a. means for supplying the secondary air to the engine exhaust system for reburning the engine exhaust gas, b. control means for controlling the operation of said secondary air supplying means in response to the engine speed and the engine temperature,
c. temperature detecting means for detecting the engine temperature at a predetermined value,
d. speed detecting means for detecting the engine speed at a predetermined high value and a predetermined low value, and
e. means operatively coupling said temperature and speed detecting means to said control means to cause said secondary air supplying means to supply secondary air to the engine exhaust gas system when the engine operates below said predetermined temperature and at the same time operates below said predetermined high speed, and when said engine operates above said predetermined temperature and at the same time below said predetermined low speed.

2. A system as claimed in claim 1, for an internal combustion engine having a spark plug for each combustion chamber, and said system includes means responsive to the engine speed below said predetermined high speed and responsive to the engine temperature below said predetermined temperature to supply the secondary air to said engine exhaust gas system and to simultaneously vary the actuation of said spark plug.

3. A system as claimed in claim 1, for an internal combustion engine having two spark plugs for each combustion chamber, and said system includes means responsive to the engine speed below said predetermined high speed and responsive to the engine temperature below said predetermined temperature to supply the secondary air to said engine exhaust gas system and to simultaneously vary the actuation of one of said two spark plugs.

4. A system for purifying the exhaust gas of an internal combustion engine comprising:
a. means for supplying secondary air to the engine exhaust gas for reburning the same,
b. control means for controlling the operation of said secondary air supplying means in response to engine speed and engine temperature,
c. said control means including first switching means switching in response to the engine temperature at a predetermined value, second switching means switching in response to the engine speed at a predetermined high speed, and third switching means switching in response to the engine speed at a predetermined low speed,
d. whereby, said secondary air supplying means supplies secondary air to the engine exhaust gas system when the engine operates below said predetermined temperature and at the same time below said predetermined high speed and when the engine operates above said predetermined temperature at the same time below said predetermined low speed.

5. A system as claimed in claim 4 wherein said first switching means includes a fixed low temperature contact operatively coupled to said second switching means, a fixed high temperature contact operatively coupled to said third switching means and a movable contact responsive to engine temperature and in contact with said fixed low temperature contact below said predetermined temperature and said fixed high temperature contact above said predetermined temperature.

6. A system for purifying an exhaust gas of an internal combustion engine including at least one spark plug for each combustion chamber and an engine inlet manifold, said system comprising:
a. means for controlling the supply of secondary air to the engine exhaust gas system for reburning the engine exhaust gas,
b. first switching means switching in response to the engine temperature at a predetermined value,
c. second switching means switching in response to the engine speed at a predetermined high speed,
d. third switching means switching in response to the engine speed at a predetermined low speed,
e. said first switching means operatively coupled to said second switching means when the engine temperature is below said predetermined value to said third switching means when the engine temperature is above said predetermined value,
f. circuit means for controlling the operation of said secondary air supply control means through said first and second switching means, whereby, when the engine operates below said predetermined temperature and at the same time below said predetermined high speed, secondary air is supplied to the engine exhaust gas, and
g. circuit means for controlling the operation of said secondary air supply control means through said first and third switching means, whereby, when the engine operates above said predetermined temperature and at the same time below said predetermined low speed, secondary air is supplied to the engine exhaust gas.

7. A system as claimed in claim 6, wherein: said first switching means includes a fixed low temperature contact operatively coupled to said second switching means, a fixed high temperature contact operatively coupled to said third switching means, and a movable contact contacting said fixed low temperature contact below said predetermined temperature and said fixed high temperature contact above said predetermined temperature.

8. A system as claimed in claim 6, for an internal combustion engine having first and second spark plugs for each combustion chamber and wherein: said system further includes means responsive to engine temperature below said predetermined temperature and responsive to engine speed below said predetermined high speed to supply the secondary air to said exhaust gas system and to simultaneously vary the actuation of said first spark plug, and responsive to engine temperature below said predetermined temperature and responsive to engine speed above said predetermined high speed to cut off the secondary air to said exhaust gas system and to simultaneously maintain the normal actuation of said first spark plug, means responsive to engine temperature above said predetermined temperature for maintaining normal actuation of said first spark plug through said first switching means regardless of the engine speed and means for maintaining normal actuation of said second spark plug regardless of the engine speed and temperature.

9. A system as claimed in claim 8, further comprising a vacuum switch responsive to vacuum of the engine inlet manifold when the engine is idling, decelerating and operating under full load for maintaining normal actuation of said first spark plug regardless of the operation of said first, second and third switching means.

10. A system for purifying an exhaust gas of an internal combustion engine comprising:
   a. means for controlling the secondary air supply to the engine exhaust gas system for reburning the engine exhaust gas,
   b. a source of electrical power,
   c. control means for electrically connecting said source and said secondary air supply controlling means,
   d. said control means including first switching means switching in response to the engine temperature at a predetermined value, second switching means switching in response to the engine speed at a predetermined high speed, and third switching means switching in response to the engine speed at a predetermined low speed, whereby, when the engine operates below said predetermined temperature and at the same time below said predetermined high speed, and when the engine operates above said predetermined temperature at the same time below said predetermined low speed, said control means supplies secondary air to the engine exhaust gas system.

11. A system for purifying the exhaust gas of an internal combustion engine having at least one spark plug for each combustion chamber and an inlet manifold, comprising:
   a. means for controlling the secondary air supply to the engine exhaust gas system for reburning the engine exhaust gas,
   b. a source of electrical power,
   c. first switching means switching in response to the engine temperature at a predetermined value, and coupling said source of electrical power to said secondary air supply controlling means,
   d. second switching means switching in response to the engine speed at a predetermined high speed, and electrically connecting said secondary air supply controlling means to said source when engine speed is below said predetermined high speed,
   e. third switching means switching in response to the engine speed at a predetermined low speed, and electrically connecting said secondary air supply control means to said source when the engine speed is below said predetermined low speed,
   f. means operatively connecting said first switching means to said second switching means when the the engine temperature is below said predetermined temperature, and to said third switching means when the engine temperature is above said predetermined temperature,
   g. whereby, said secondary air supply control means acts to supply secondary air to the engine exhaust gas system when the engine operates below said predetermined temperature and at the same time below said predetermined high speed, and when the engine operates above said predetermined temperature and at the same time below said predetermined low speed.

12. A system as claimed in claim 11, for an internal combustion engine having first and second spark plugs for each combustion chamber, said system further comprising: first ignition means for igniting said first spark plug and second ignition means for igniting said second spark plug, means operatively coupling said first ignition means to said second switching means for varying the actuation of said first spark plug below said predetermined temperature and at the same time below said predetermined high speed and for maintaining the normal actuation of said first spark plug below said predetermined temperature and at the same time above said predetermined high speed and to said first switching means for maintaining the normal actuation of said first spark plug above said predetermined temperature regardless of the engine speed, and means coupling said second ignition means to said source of electrical power for maintaining the normal actuation of said second spark plug regardless of said engine speed and temperature.

13. A system as claimed in claim 12, further comprising: a vacuum switch responsive to vacuum of the engine inlet manifold when the engine is idling, decelerating and operating under full load for maintaining the normal actuation of said first spark plug regardless of the operation of said first, second and third switching means.

14. A system for purifying an exhaust gas of an internal combustion engine having at least one spark plug for each combustion chamber, comprising:
   a. means for controlling the secondary air supply to the engine exhaust gas system for reburning the engine exhaust gas,
   b. a source of electrical power,
   c. first switching means switching in response to the engine temperature at a predetermined value,
   d. said first switching means including a movable contact coupled to said source of electrical power, a fixed high temperature contact operatively coupled to said movable contact above said predetermined temperature and a fixed low temperature contact operatively coupled to said movable contact below said predetermined temperature,
   e. second switching means operatively coupled to said low temperature contact and switching at a predetermined high engine speed,
   f. means operatively connecting said second switching means to said secondary air supply control means when the engine speed is below said predetermined high speed,
   g. third switching means operatively coupled to said high temperature contact and switching in response to a predetermined low engine speed,
   h. means operatively connecting said third switching means to said secondary air supply control means when the engine speed is below said predetermined low speed;
   whereby, said secondary air supply control means acts to supply the secondary air to the engine exhaust gas when the engine operates below said predetermined temperature and at the same time below said predetermined high speed, and when the engine operates above said predetermined temperature and at the same time below said predetermined low speed.

* * * * *